UNITED STATES PATENT OFFICE.

MARK ANTHONY CUSHING, OF GLENS FALLS, NEW YORK, ASSIGNOR TO THE GLENS FALLS PAPER COMPANY.

IMPROVED PROCESS FOR TREATING HEMP, FLAX, &c., FOR THE MANUFACTURE OF PAPER-PULP.

Specification forming part of Letters Patent No. 50,419, dated October 10, 1865.

*To all whom it may concern:*

Be it known that I, MARK ANTHONY CUSHING, of Glens Falls, in the county of Washington and State of New York, have invented a new and improved process for treating hemp, flax, and the coarse tow of hemp and flax known as "swingling-tow," containing shives of the flax or the woody part of flax and hemp and other vegetable and fibrous substances, for the purpose of preparing them to be used in the manufacture of fine paper; and I do hereby declare that the following is a full and exact description thereof.

The nature of my invention consists in the mode of preparing a proper boiling-liquor by the use of the articles hereinafter named, in the use of such liquor when prepared so as to remove from hemp, flax, and the swingling-tow of hemp and flax all woody and other substances hurtful to the manufacture of the same into a fine pulp for paper, and also in the use of the substances thus prepared in the manufacture of paper, either by mixing the same with other pulp or without mixing the same.

The superiority of my manner of treating woody and fibrous substances for the purpose of converting them into a pulp for the manufacture of paper will be seen in my successful treatment of swingling-tow containing the shives of the flax or hemp.

Paper-makers hitherto have found it difficult, if not impossible, to use the coarse swingling-tow of hemp or flax in the manufacture of fine paper because of the presence of the woody part of the hemp or flax known as the "shive," which, according to any process of treatment known to them, they were unable to remove by boiling; and the consequence was that, while paper-stock was very valuable in market, swingling-tow was of little or no value for the manufacture of fine paper. By the use of my process I take the coarse swingling-tow of hemp or flax with all the shives or woody parts remaining in the same, and convert the whole of it, without waste, into a soft and delicate pulp suited to the manufacture of fine white writing or printing paper, turning to advantage the presence of the shives or woody part of the hemp or flax.

The materials which I use in the constitution of my boiling-liquor are soda-ash, borax, lime, crude petroleum, and water.

The proportions of the above material which I use in the preparation of my boiling and my manner of combining them are as follows: I use a circular pan, with a stirring apparatus attached, of a capacity of eleven hundred gallons. I fill this pan about half-full of water. Then by means of a steam-pipe I introduce steam into the pan or water therein, and add four hundred pounds of soda-ash of the strength of 48°, constantly stirring the contents until a boiling heat is attained. When the mixture boils I then add five pounds of borax and three hundred pounds of unslacked lime, the immediate slacking of which produces an intense heat and causes a perfect union of all the ingredients composing the boiling-liquor. At this particular time I also add to the mixture six quarts of crude petroleum, and permit the solution to boil for fifteen minutes. I then let into the pan cold water and steam together until the pan is filled, when I let the liquor settle. If permitted to remain undisturbed the solution will become clear and transparent, and the several ingredients used in the constitution of the liquor will be perfectly united in the solution. The solution, becoming perfectly clear, is drawn off into a receiving-vessel for use by means of a siphon or bent tube. Its strength will be from 4° to 4½° Baumé. For thirty hundred weight of coarse swingling-tow I use about fifteen hundred gallons of this liquor, or about one gallon of the liquor to two pounds of the tow. I use a rotary boiler twenty-two feet in length and six feet in diameter, in which I can boil at one charge thirty hundred weight of swingling-tow in fifteen hundred gallons of this boiling-liquor.

My boiler is charged and closed in the manner well known to the art and trade of the paper-maker, after which heat is applied thereto until a temperature indicated by an internal pressure of from sixty to one hundred pounds to the inch is attained. At an internal pressure upon the boiler of sixty pounds to the square inch I boil for six hours. At an internal pressure of one hundred pounds to the square inch I boil for four hours.

By the foregoing treatment of swingling-tow in such liquor it is reduced to a soft and silky condition, suitable for the manufacture of fine paper. The shives are thereby reduced to a pulpy mass and made to contribute to the stock suitable for paper. By this treatment the fiber is not injured, and when washed it is minutely separated and will mix perfectly with other pulp or paper-stock. The tow thus treated and prepared may be manufactured into paper unmixed with other stock, or it may be mixed with straw or other stock. For making newspaper I take one pound of the tow thus prepared and mix it with ten pounds of pulp manufactured from straw, and it makes a superior article of fine newspaper, as soft and strong as that made from rags. The hemp, flax, or tow thus prepared is entirely free from particles of woody matter or shives which interfere with the quality of the paper, as all such parts by the foregoing treatment are reduced to a perfectly pulpy state, and that without injuring in any degree the fiber treated, and the swingling-tow thus treated, with all its shives or woody fiber, can be wrought into a fine, strong, and colorless paper superior to that made from rags.

Having thus described the nature and manner of preparing my boiling-liquor, and the process of preparing and using the same, and the product produced by its use, what I claim as my invention, and desire to secure by Letters Patent, is—

1. The aforesaid method or process of preparing my boiling-liquor by the use of the ingredients before named, in the manner before described, substantially and for the purposes therein described.

2. The use of the above-described boiling-liquor in the reduction of flax, hemp, swingling-tow, and other woody and fibrous substances, in the manner substantially and for the purposes therein described.

3. The use of the material thus treated, as flax, hemp, tow, and other woody and fibrous substances, in the manufacture of fine paper, whether in mixture with straw and other paper-stock, in any proportions, or unmixed.

4. The use of crude or other petroleum, kerosene, benzine, or other oleaginous substances, in the manner substantially and for the purposes above described.

MARK ANTHONY CUSHING.

Witnesses:
S. P. MILLINGTON,
A. T. HARRIS.